[US010141725B2](#)

(12) United States Patent
Ionescu

(10) Patent No.: US 10,141,725 B2
(45) Date of Patent: Nov. 27, 2018

(54) ARC FAULT RESISTANT ELECTRIC EQUIPMENT

(71) Applicant: SIEMENS AKTIENGESELLSCHAFT, München (DE)

(72) Inventor: Bogdan Ionescu, McMurray, PA (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/538,941

(22) PCT Filed: Jan. 11, 2016

(86) PCT No.: PCT/US2016/012798
§ 371 (c)(1),
(2) Date: Jun. 22, 2017

(87) PCT Pub. No.: WO2016/130248
PCT Pub. Date: Aug. 18, 2016

(65) Prior Publication Data
US 2017/0365987 A1 Dec. 21, 2017

Related U.S. Application Data

(60) Provisional application No. 62/114,262, filed on Feb. 10, 2015.

(51) Int. Cl.
*H01H 33/53* (2006.01)
*H02B 13/025* (2006.01)
(Continued)

(52) U.S. Cl.
CPC ........... *H02B 13/025* (2013.01); *H01H 9/341* (2013.01); *H01H 9/342* (2013.01); *H01H 33/53* (2013.01);
(Continued)

(58) Field of Classification Search
CPC .... H01H 59/0009; H01H 1/0036; H01H 1/50; H01H 2001/0042; H01H 2001/0052;
(Continued)

(56) References Cited

U.S. PATENT DOCUMENTS

2014/0131090 A1* 5/2014 Gingrich ............... H02B 1/565
174/560
2016/0043532 A1* 2/2016 Zende .................. H02B 13/025
361/611

(Continued)

FOREIGN PATENT DOCUMENTS

CN 1461508 A 12/2003
DE 1191458 B 4/1965
(Continued)

OTHER PUBLICATIONS

PCT International Search Report and Written Opinion of International Searching Authority dated Apr. 19, 2016 corresponding to PCT International Application No. PCT/US2016/012798 filed Jan. 11, 2016.

*Primary Examiner* — Truc Nguyen

(57) ABSTRACT

Conductive elements (104A-C) are positioned within a housing (100) of an electric device. The conductive elements (104A-C) are arranged such that in an event of an electric arc (106) occurring between the conductive elements (104A-C) an electromagnetic force is exerted upon plasma of the electric arc (106) such that the electric arc (106) is directed towards a wall (108) of the housing (100). Furthermore, a conductor configuration (102) includes conductors (104A, 104B, 104C) and sacrificial electrodes (118A-C) positioned within a housing (100) of an electric device, wherein the conductors (104A-C) are arranged such that in an event of an electric arc (106) occurring between the conductors (104A-C) an electromagnetic force is exerted upon plasma of the electric arc (105) such that the electric arc (106) is directed towards the sacrificial electrodes (118A-C).

16 Claims, 2 Drawing Sheets

(51) Int. Cl.
*H01H 9/34* (2006.01)
*H02B 1/28* (2006.01)

(52) U.S. Cl.
CPC ......... *H02B 1/28* (2013.01); *H01H 2009/343* (2013.01)

(58) Field of Classification Search
CPC ..... H01H 2001/0084; H01H 2057/006; H01H 2061/006; H01H 57/00; H01H 61/02
See application file for complete search history.

(56) References Cited

U.S. PATENT DOCUMENTS

2016/0204582 A1* 7/2016 Lee .................. H02B 1/20
            361/624
2016/0248234 A1* 8/2016 Rajauria .......... H02B 1/30

FOREIGN PATENT DOCUMENTS

| | | |
|---|---|---|
| DE | 4142518 A1 | 6/1993 |
| DE | 4328241 A1 | 2/1995 |
| EP | 2587599 A1 | 5/2013 |
| JP | H08191510 A | 7/1996 |
| RU | 2394298 C2 | 7/2010 |
| WO | 20070085209 A1 | 8/2007 |

* cited by examiner

ARC FAULT RESISTANT ELECTRIC EQUIPMENT

CROSS REFERENCE TO RELATED APPLICATION

This Application is the U.S. National Stage of International Application No. PCT/US2016/012798 filed 11 Jan. 2016 and claims benefit thereof, the entire content of which is hereby incorporated herein by reference. The International Application claims benefit of U.S. Provisional Patent Application No. 62/114,262 filed 10 Feb. 2015 in the United States Patent and Trademark Office, the content of which is herein incorporated by reference in its entirety.

BACKGROUND

1. Field

Aspects of the present invention generally relate to arc fault resistant electric equipment, such as for example power supplies, transformers and circuit breakers.

2. Description of the Related Art

An electric device or equipment, such as for example a power supply, transformer or circuit breaker, is typically housed in an enclosure or cabinet. Arc faults may occur within enclosures or cabinets due to for example faulty connections. An internal short circuit may result in an arc fault. Air is ionized between two or more potentials in the electric device by the arc fault, causing an arc flash comprising a plasma cloud of rapidly expanding vaporized metallic materials. The plasma causes high pressures and temperatures to build up quickly, in fractions of a second, within the enclosure. The arc fault conditions must either be contained within the enclosure or vented to the outside of the electric device enclosure.

Arc fault effects are devastating for the equipment where it occurs and secondary effects such as explosive elimination of shrapnel and toxic gases cause serious hazards for personnel. While the electric arc is burning, significant damage of components inside the cabinet occurs in part due to the uncontrolled way the arc is burning. Additionally, the electric arc has a tendency to move inside the cabinet away from the source of energy. This way the damage inside is substantial and as a rule causes permanent damage to the entire cabinet and its contents. Thus, there still exists a need for an improved electric equipment cabinet or enclosure, in particular arc fault resistant electric equipment.

SUMMARY

Briefly described, aspects of the present invention relate to an electric device and a conductor configuration for arc fault resistant electric equipment, including low and medium/high voltage equipment, in particular electric equipment comprising an enclosure, cabinet or housing such as for example power supplies, transformers, circuit breakers.

According to a first aspect of the present invention, an electric device comprises a plurality of conductive elements positioned within a housing of the electric device, wherein the plurality of conductive elements are arranged such that in an event of an electric arc occurring between the plurality of conductive elements an electromagnetic force is exerted upon plasma of the electric arc such that the electric arc is directed towards a wall of the housing.

According to a second aspect of the present invention, a conductor configuration for an electric device comprises a plurality of conductors positioned within a housing of the electric device, and a plurality of sacrificial electrodes positioned within the housing of the electric device, wherein the plurality of conductors are arranged such that in an event of an electric arc occurring between the plurality of conductors an electromagnetic force is exerted upon plasma of the electric arc such that the electric arc is directed towards the plurality of sacrificial electrodes.

DETAILED DESCRIPTION

To facilitate an understanding of embodiments, principles, and features of the present invention, they are explained hereinafter with reference to implementation in illustrative embodiments. In particular, they are described in the context of being an electric device and a conductor configuration for arc fault resistant electric equipment such as for example power supplies, transformers, circuit breakers etc. Embodiments of the present invention, however, are not limited to use in the described methods or system.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
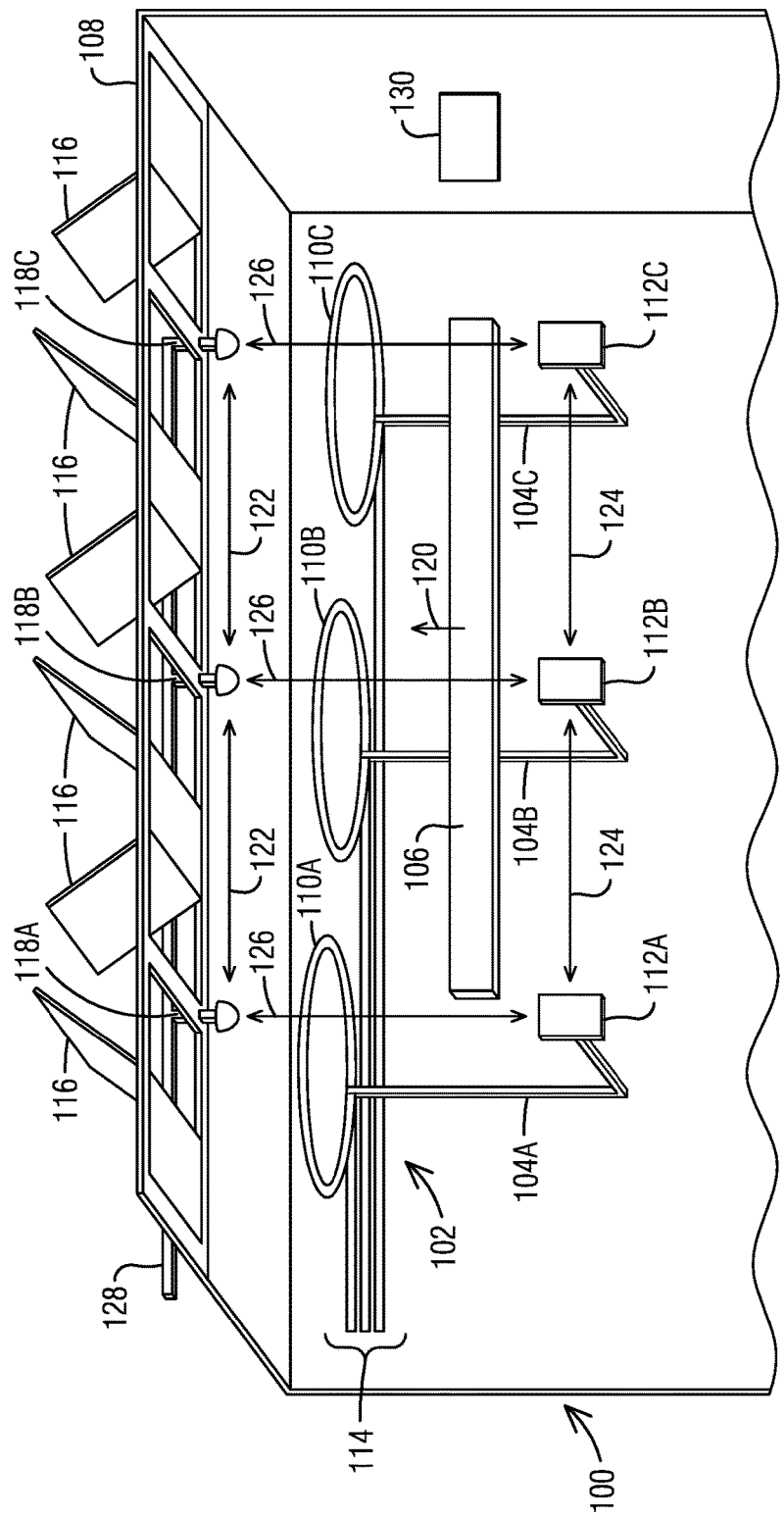
FIG. 1 shows a representation of perspective schematic view inside a cabinet or enclosure of an electric device in accordance with an exemplary embodiment of the present invention.

FIG. 1 shows a representation of perspective schematic view inside a cabinet or enclosure 100 of an electric device in accordance with an exemplary embodiment of the present invention. The cabinet 100 may comprise for example metal.

In order to improve the safety of an electric device during an arc fault, an internal arc fault path is created based upon a specific configuration 102 of conductive elements 104A, 104B, and 104C. The conductive elements 104A, 104B, 104C feed electrical energy to electric elements, such as for example a transformer, which is for example three-phase, medium-voltage power. The conductive elements 104A, 104B, 104C are electrical conductors, for example cables, each comprising at a first end an electrode 112A, 112B, 112C for feeding the electrical energy to the transformer. At second ends 114, the conductive elements 104A, 104B, 104C are connected to a power source or power supply providing the electrical energy. Each conductive element 104A, 104B, 104C illustrates one phase of the three-phase, medium-voltage power.

As shown in FIG. 1, the electrodes 112A, 112B, 112C are located inside the cabinet 100. Between these electrodes 112A, 112B, 112C, an electric arc may be ignited, as demonstrated by the electric arc 106. The specific configuration 102 of the conductors 104A, 104B, 104C causes an electromagnetic force to be exerted upon the plasma of the electric arc 106 such that the electric arc 106 is lengthened and directed towards to a top wall 108 of the cabinet 100. Arrow 120 indicates that the electric arc 106 is moving, in particular towards the top wall 108.

According to the specific configuration 102, the conductive elements 104A, 104B, 104C are arranged such that they form loops 110A, 110B, 110C with one or more turns. For example, conductive element 104A forms loop 110A, conductive element 104B forms loop 110B, and conductive element 104C forms loop 110C. As illustrated in FIG. 1, each loop 110A, 110B, 110C is a single loop, i.e. comprises one turn. But each loop 110A, 110B, 110C may comprise several turns such that a multiple-loop-configuration may be provided.

According to a further embodiment, at the top wall 108 of the cabinet 100, above where the electric arc 106 originates, pressure relief flaps 116, made for example of ordinary (permeable) magnetic steel, are provided through which the plasma of the electric arc 106 vents out of the cabinet 100. Thereby, the effect of a blow out magnetic force is enhanced even further. The pressure relief flaps 116 are hinged and will open due to internal pressure of the explosion when the electric arc 106 is ignited, and allow elimination of the plasma (plasma cloud) out of the cabinet 100 and thus avoid significant damage to the electric elements inside the cabinet 100.

A side effect of an arc fault is arc erosion. Arc erosion is the loss or transfer of material from contact surfaces which takes place during arcing. According to a further embodiment of the present invention, sacrificial electrodes 118A, 118B, 118C are provided. As illustrated, for each electrode 112A, 112B, 112C of the conductive elements 104A, 104B, 104C, exactly one sacrifical electrode 118A, 118B, 118C is provided (one of ordinary skill in the art will appreciate that more sacrifical electrodes in different arrangements may be provided).

As illustrated in FIG. 1, the sacrifical electrodes 118A, 118B, 118C are arranged opposite the electrodes 112A, 112B, 112C and in proximity to a wall of the housing 100, in particular in proximity to the top wall 108 of the cabinet 100. Specifically, one sacrifical electrode 118A, 118B, 118C is arranged opposite one electrode 112A, 112B, 112C such that pairs comprising an electrode 112A, 112B, 112C and a sacrificial electrode 118A, 118B, 118C are formed. The loops 110A, 110B, 110C are arranged in proximity to the sacrificial electrodes 118A, 118B, 118C. The sacrificial electrodes 118A, 118B, 118C are arranged with a defined distance to each other as indicated by arrows 122, and the electrodes 112A, 112B, 112C are arranged with a defined distance to each other as indicated by arrows 124. Distances between the electrodes of the same type or between electrodes of different types within a pair may be equal. The distances between the sacrificial electrodes 118A, 118B, 118C correspond the distances between the electrodes 112A, 112B, 112C so that they are opposite each other. FIG. 1. Shows three pairs of electrodes, wherein electrodes of a pair are arranged with a defined distance to each other as arrows 126 show, the distances between electrodes of a pair being equal.

In an exemplary embodiment, the sacrificial electrodes 118A, 118B, 118C are connected solidly to ground at first ends, for example to ground conductor 128. The ground conductor 128 may be arranged outside the cabinet 100 or inside the cabinet 100, depending on a configuration of the electric equipment. FIG. 1 shows that the ground conductor 128 is arranged outside the cabinet 100, and the sacrifical electrodes 118A, 118B, 118C are arranged such that they penetrate the top wall 108 of the cabinet 100 and extend into the cabinet 100. Second ends of the sacrificial electrodes 118A, 118B, 118C which are opposite the first ends extend into the cabinet 100. In a further exemplary embodiment, the ground conductor 128 may be arranged inside the cabinet 100. In case that the ground conductor 128 is arranged inside the cabinet 100, the sacrificial electrodes 118A, 118B, 118C do not penetrate the cabinet 100 since the ground conductor 128 and all sacrifical electrodes 118A, 118B, 118C are arranged inside the cabinet 100. But the ground conductor 128 may exit, for example penetrate, the cabinet 100, to the outside of the cabinet 100 to be connected to ground.

The sacrifical electrodes 118A, 118B, 118C may extend into the cabinet 100 as far as necessary to ensure that the three phase electric arc 106 will move towards the top wall 108 of the cabinet 100 and become a set of three phase to ground arcs thereby resisting arc erosion which would occur between the electrodes 112A, 112B, 112C, which typically are exposed, bar metal, electrodes. The set of three phase to gournd arcs burn until a dedicated equipment, for example a switch, will disconnect the fault. In a further development of the present invention, the cabinet 100 comprises one or more arc fault detection sensors 130 which can initiate a process of tripping the switch.

In order to secure the loops 110A, 110B, 110C of the conductive elements 104A, 104B, 104C to the cabinet 100, in particular to the ceiling, i.e. inside of the top wall 108, of the cabinet 100, specially designed fixtures are required. As noted before, the conductive elements 104A, 104B, 104C may be medium voltage cables. Such medium voltage cables are quite heavy and it is difficult to form loops as needed. Thus, the electric device further comprises a plurality of fastening/fixing devices 131. Such fastening/fixing devices 131 comprise for example elastic clamps and safety pins secured with bolts to the ceiling of the cabinet 100.

Figure 2:
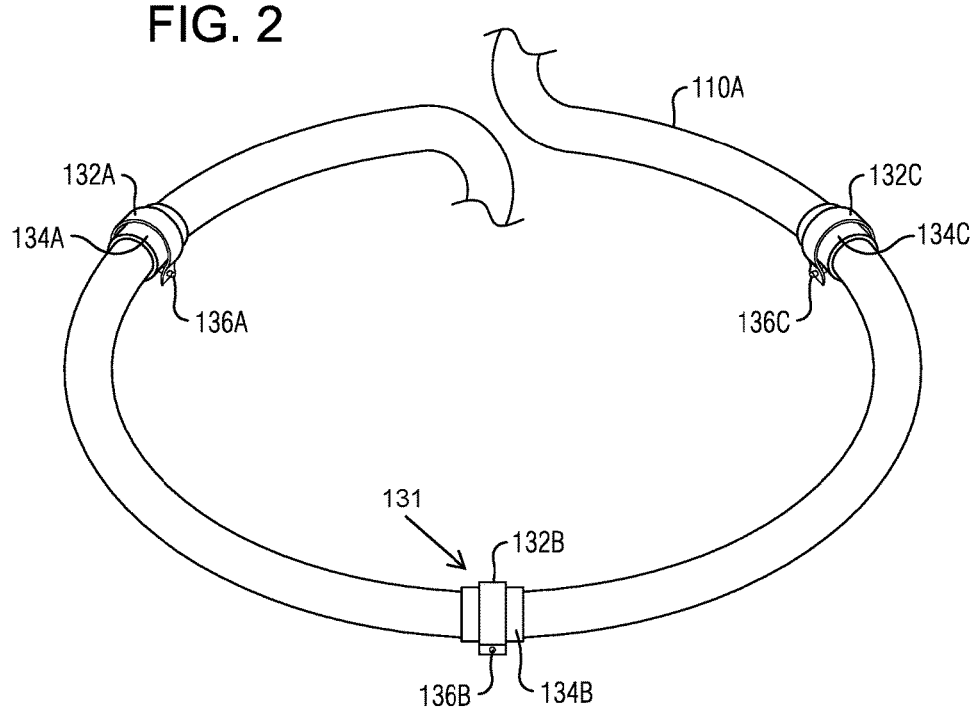
FIG. 2 shows a representation of a perspective schematic view of a conductive element including elastic clamps of an electric device in accordance with an exemplary embodiment of the present invention.

FIG. 2 shows a section of the loop 110A of the one phase conductive element 104A (see FIG. 1) including three fastening devices 131 with elastic clamps 132A, 132B, 132C. A spacing of the clamps 132A, 132B, 132C must conform to a desired curvature of the loop 110A depending on the respective cable diameter. FIG. 2 further shows protective sleeves 134A, 134B, 134C for each clamp 132A, 132B, 132C, wherein one or more sleeves 134A, 134B, 134C is/are arranged between clamps 132A, 132B, 132C and conductive element 104A. The conductive element 104A (cable) and the additional protective sleeves 134A, 134B, 134C can be pushed into the elastic clamps 132A, 132B, 132C and kept securely by elasticity of the clamps 132A, 132B, 132C and by safety pins 136A, 136B, 136C. Details of the clamp arrangement are depicted in FIG. 3.

Figure 3:
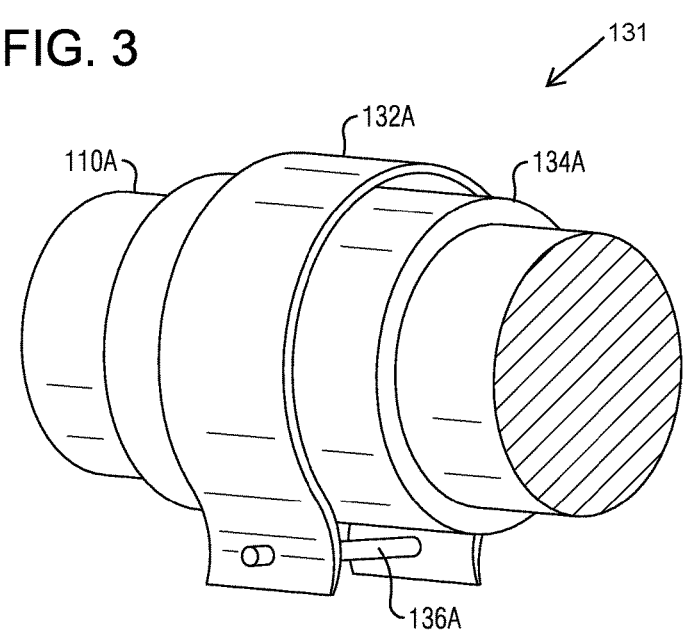
FIG. 3 shows a representation of a perspective schematic view of an elastic clamp arrangement for a conductive element in accordance with an exemplary embodiment of the present invention.

FIG. 3 shows a section of the loop 110A as shown in FIG. 2 with a fastening device 131 including an elastic clamp 132A, a protective sleeve 134A, and a safety pin 136A. The additional sleeve 134A has a dual role, because it provides protection to the conductive element 104A while being pushed into the elastic clamp 132A and also serves as an intermediary adapter for possibly different diameter cables. The safety pin 136A provides additional security to the position of the cable 104A, particularly during short circuit. The elastic clamp 132A is secured to the ceiling of the cabinet 100, for example using a bolt. One of ordinary skill in the art will appreciate that many other means and devices for securing the clamp 132A to the cabinet 100 are available.

The clamp arrangement described herein provides a reliable and easy to use solution to route for example medium voltage cable during commissioning of the electric equipment without the need to pre-form the arrangement. In another exemplary embodiment, additional elastic clamps can be used inside the cabinet 100 to help secure the conductive elements 104A, 104B, 104C at different locations as needed, besides the respective loops 110A, 110B, 110C. The safety pins 136A, 136B, 136C are made of material with appropriate structural strength but insulating in order to avoid creating conductive loops around the loops 110A, 110B, 110C of the conductive elements (cables) 104A, 104B, 104C.

As described herein, the fault current and its electromagnetic consequence (Lorentz force distribution) is used to alleviate the damaging effects by helping to move the electric arc 106 in an area where the damage is greatly reduced and controlled. Thus the chances of saving components inside the cabinet 100 are greatly enhanced while applying forces on the arc 106 may help extinguishing the arc 106. The electromagnetic Lorentz force is strongly dependent on the magnitude of the fault current and thus the effects are increasing as the magnitude of the fault current increases. Furthermore, the proposed arrangements and configurations of elements, in particular the configuration of the conductors 104A, 104B, 104C and the arrangements of the sacrificial electrodes 118A, 118B, 118C are easy and simple to implement.

One or ordinary skill in the art will appreciate that the cabinet 100 may comprise other components and elements not described herein. For example, the cabinet 100 of the electric equipment may further comprise air intakes which may also be configured to block or reduce escaping of the plasma out of the enclosure 100 through the air intakes while allowing cooling airflow to enter the power supply enclosure 100 during normal operation.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

The invention claimed is:

1. An electric device comprising:
   a plurality of conductive elements positioned within a housing of the electric device, wherein in an event of an electric arc occurring between the plurality of conductive elements an electromagnetic force is exerted upon plasma of the electric arc such that the electric arc is directed towards a wall of the housing,
   wherein each conductive element comprises an electrode at a first end, the electric arc ignited between the electrodes of the conductive elements, and
   further comprising a plurality of sacrificial electrodes positioned within the housing,
   wherein the plurality of sacrificial electrodes are arranged opposite the electrodes of each conductive element and in proximity to the wall of the housing.

2. The electric device as claimed in claim 1, wherein the conductive elements form loops, the loops arranged in proximity to the sacrificial electrodes.

3. The electric device as claimed in claim 1, wherein the plurality of sacrificial electrodes are connected to a ground conductor, the ground conductor being positioned outside the housing.

4. The electric device as claimed in claim 3, the plurality of sacrificial electrodes penetrating the wall and extending into the housing.

5. The electric device as claimed in claim 1, the plurality of sacrificial electrodes being connected to a ground conductor, the ground conductor being positioned inside the housing.

6. The electric device as claimed in claim 2 further comprising a plurality of fastening devices for securing the loops of the conductive elements to the housing.

7. The electric device as claimed in claim 6, wherein the plurality of fastening devices comprises elastic clamps and safety pins.

8. The electric device as claimed in claim 6 further comprising a plurality of protective sleeves, each protective sleeve being positioned between a fastening device and a conductive element.

9. The electric device as claimed in claim 1 further comprising a plurality of pressure relief flaps positioned within the wall of the housing to which the electric arc is directed, the pressure relief flaps being configured to be closed in absence of the electric arc in the housing and to open in presence of the electric arc in the housing such that the plasma of the electric arc vents out of the housing via the pressure relief flaps, the pressure relief flaps comprising magnetic steel such that the electromagnetic force is enhanced.

10. A conductor configuration for an electric device comprising:
    a plurality of conductors positioned within a housing of the electric device, and
    a plurality of sacrificial electrodes positioned within the housing of the electric device,
    wherein in an event of an electric arc occurring between the plurality of conductors an electromagnetic force is exerted upon plasma of the electric arc such that the electric arc is directed towards the plurality of sacrificial electrodes, and
    wherein the plurality of sacrificial electrodes are arranged in proximity to a wall of the housing.

11. The conductor configuration as claimed in claim 10, wherein the plurality of conductors each form one or more loops, the loops arranged in proximity to the plurality of sacrificial electrodes.

12. The conductor configuration as claimed in claim 11 further comprising a plurality of fastening devices for securing the one or more loops to an inner surface of the housing.

13. The conductor configuration as claimed in claim 12, wherein the plurality of fastening devices comprises elastic clamps.

14. The conductor configuration as claimed in claim 12 further comprising a plurality of protective sleeves, each protective sleeve being positioned between a fastening device and a conductor.

15. The conductor configuration as claimed in claim 10, wherein the plurality of sacrificial electrodes are connected to a ground conductor, the ground conductor being positioned outside the housing.

16. The conductor configuration as claimed in claim 10, wherein the plurality of sacrificial electrodes are connected to a ground conductor, the ground conductor being positioned inside the housing.

* * * * *